United States Patent [19]

Spica

[11] Patent Number: 4,986,209
[45] Date of Patent: Jan. 22, 1991

[54] PORTABLE DISPLAY MEANS

[75] Inventor: Joseph P. Spica, Livonia, Mich.

[73] Assignee: The 2500 Corporation, Birmingham, Mich.

[21] Appl. No.: 479,219

[22] Filed: Feb. 12, 1990

Related U.S. Application Data

[63] Continuation-in-part of Ser. No. 207,739, Jun. 16, 1988, abandoned.

[51] Int. Cl.$^5$ .............................................. B60Q 1/32
[52] U.S. Cl. .................................. 116/28 R; 116/173

[56] References Cited

U.S. PATENT DOCUMENTS

| | | | |
|---|---|---|---|
| 2,452,842 | 11/1948 | Davis | 116/173 |
| 3,127,868 | 4/1964 | Guthrie | 116/173 |
| 3,239,957 | 3/1966 | Snediker | 116/174 |
| 3,493,203 | 2/1970 | Gualano | 116/174 |
| 3,672,323 | 6/1972 | Hawes | 116/28 |
| 3,762,360 | 10/1973 | Hawes | 116/28 R |
| 4,163,426 | 8/1979 | O'Neill | 116/28 R |
| 4,348,978 | 9/1982 | Brucato | 116/28 R |
| 4,519,153 | 5/1985 | Moon et al. | 116/28 R |
| 4,590,883 | 5/1986 | Steed et al. | 116/28 R |
| 4,595,165 | 7/1986 | Klingensmith et al. | 248/539 |
| 4,650,147 | 3/1987 | Griffin | 116/28 R |

*Primary Examiner*—William A. Cuchlinski, Jr.
*Assistant Examiner*—Daniel G. DePumpo
*Attorney, Agent, or Firm*—Dykema Gossett

[57] ABSTRACT

An emergency distress signal, including a substantially "s" shaped channel member, with one leg of the channel being insertable over the side glass of an automotive vehicle, to be entraped between the side glass and the window channel, and the other leg of the "s" shaped channel member holding, in combination with a rod locater means, a collapsible flagstaff having an emergency distress flag attached thereto. The emergency distress signal is collapsible and self storing.

38 Claims, 2 Drawing Sheets

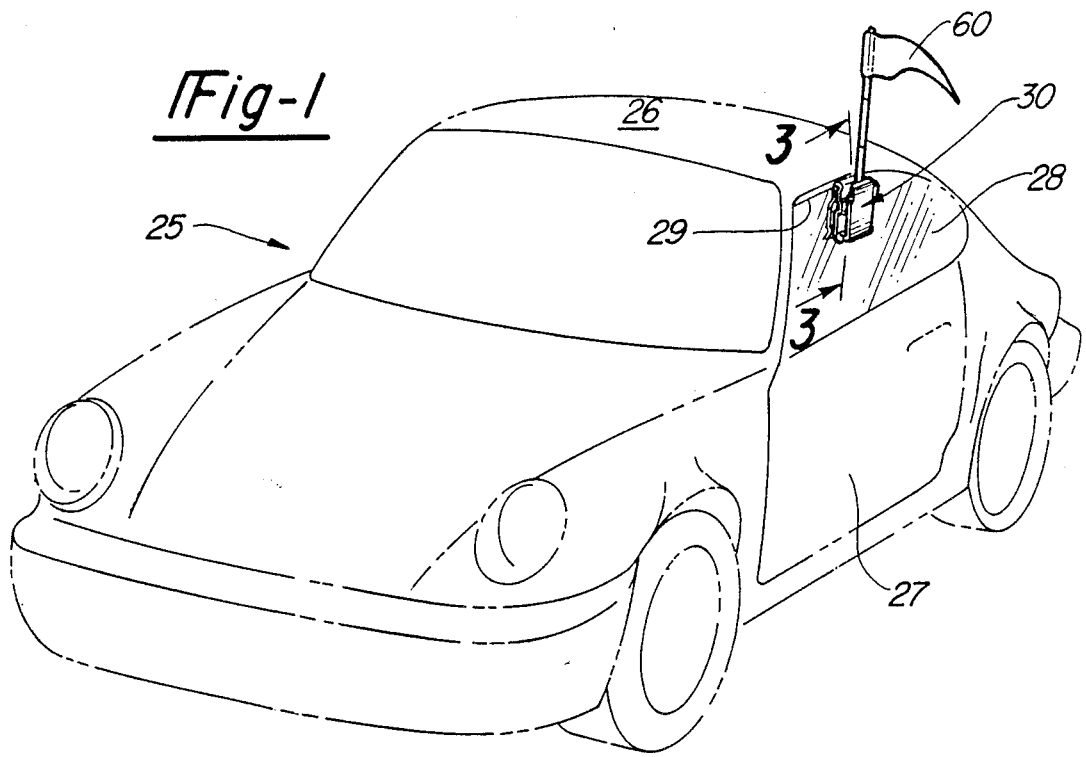
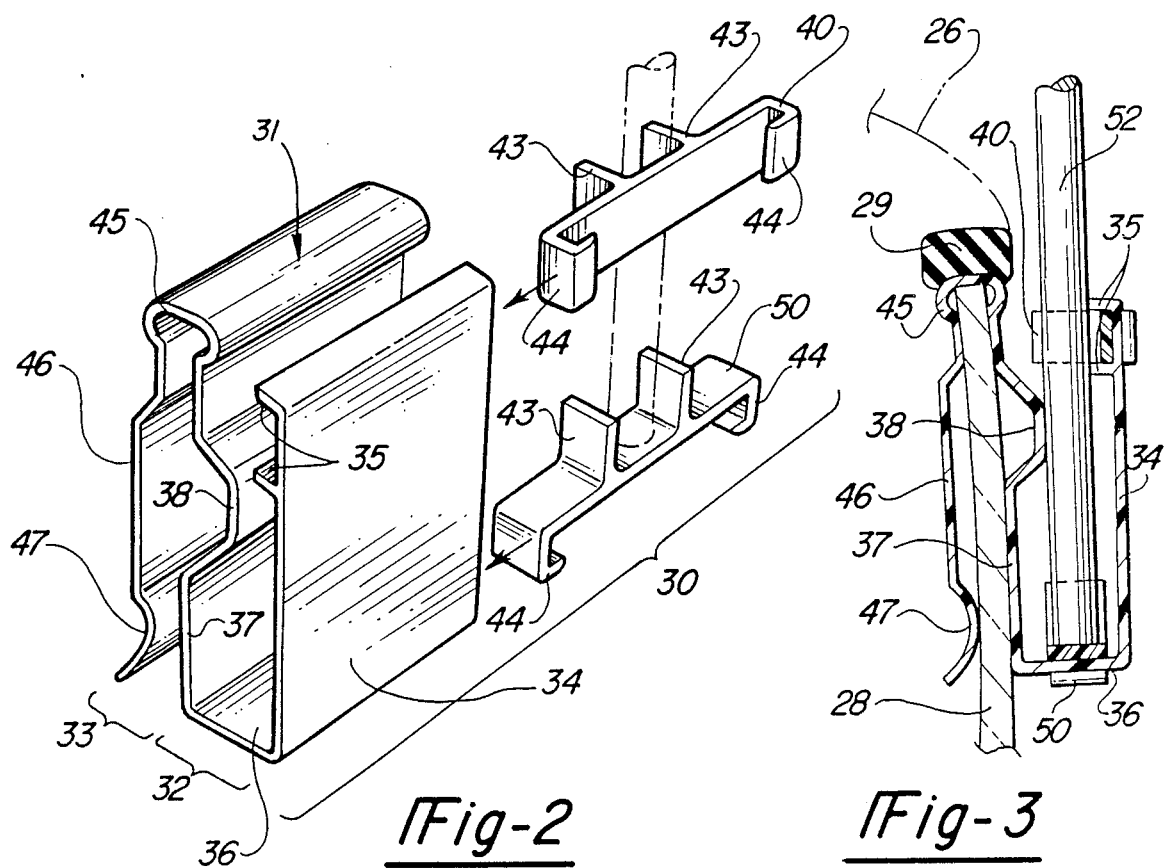

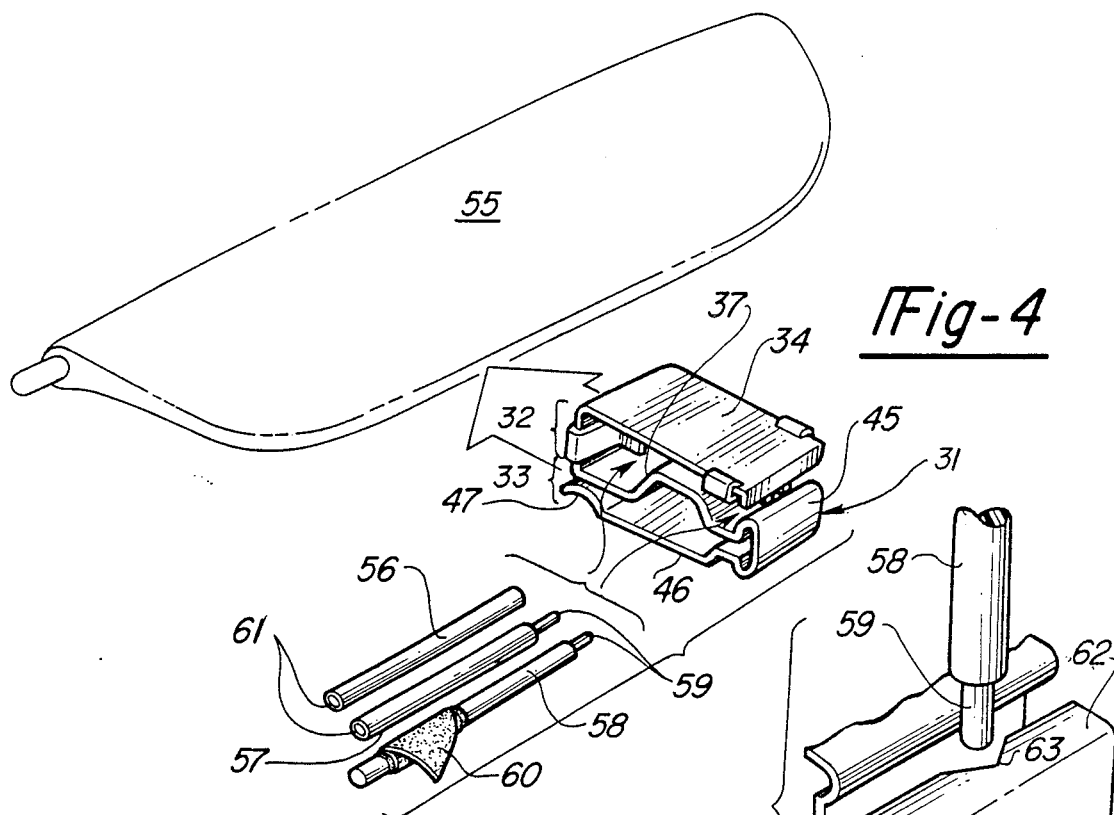
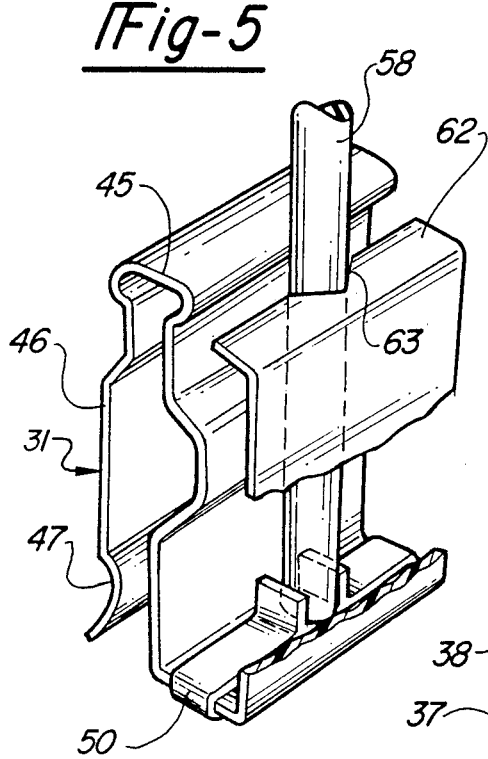
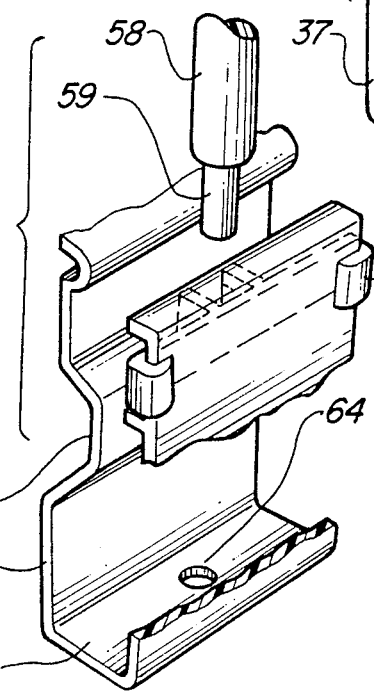

PORTABLE DISPLAY MEANS

This is a continuation-in-part of copending application Ser. No. 207,739 filed on June 16, 1988.

BACKGROUND OF THE INVENTION

1. Field of the Invention

The present invention relates to a portable display means, one embodiment thereof being a portable emergency distress signal for automotive vehicles which may, in its disassembled form, easily be stored in an automotive vehicle, but when assembled, be clipped to the side window to provide a distress flag which is easily seen all around the automotive vehicle. It should be understood that the invention can be used in many ways, such as to display political banners, etc.

2. Description of the Prior Art

Practically since the time of the invention of the automobile, there has been the need for a distress signal to be used when such an automobile encounters mechanical problems. Many devices are known in the prior art showing various types of distress signals attachable either to the roof, the hood, the bumper or the side view mirror of the automotive vehicle by the driver when an emergency occurs.

Typically, these devices will consist of a base portion, which is usually magnetic in the case of devices to be attached to the hood or roof of the automobile, and which may be of other types when it is desired to attach the device to the sideview mirror of the automobile or perhaps, the bumper, thereof. However, these prior art devices are rather bulky in nature, in many cases, and there are several problems in the art associated therewith.

One attempt at providing an emergency distress signal involved devices which attach to the front or the rear bumper of the automobile, but these tended either not to be tall enough to provide for the emergency distress flag to be seen over the automobile, or they tended to be very bulky, because of the size of the pole which was needed in conjunction with the mounting means to raise the flag high enough to be seen.

An attempt to get around this problem was to provide magnetic mountings for mounting the flag on the hood or the roof of an automobile, similar to the flag which may be seen in funeral processions. However, these flags, if they are mounted on the hood, are mounted so low that they are not easily seen by other drivers when the automobile is parked off to the road by itself, rather than being in a line of cars. When mounted on the roof of the automobile, although the flags can be seen, in many cases they can not be so mounted because of the vinyl roofs which are prevalent in the automotive market. Also, these devices tended to be rather heavy and expensive, because of the magnets needed to hold them in place.

Another attempt to solve the problem of providing a satisfactory emergency distress signal was to make a distress signal mounted to the side view mirror of the automotive vehicle. This attempt at a solution, however, proved to be no more satisfactory than other solutions, due to the difficulties of mounting such a device to the side view mirror.

Another further attempt was made to find a satisfactory solution to the problem by mounting an emergency distress signal to the antenna of the automotive vehicle. It was soon found that this solution could not be used in cars which had their radio antenna embedded in the windshield glass. Also, it was found that if the emergency distress flag was made sturdily enough to withstand use, it was relatively heavy, and depending on the type of antenna, it would either bend the antenna excessively, or, if such antenna was a power antenna, expensive damage could be occasioned to such antenna. It was further found that in many cars if the power failed, the power antenna automatically retracts, leaving no place to mount the emergency distress signal.

Thus, this attempted solution to the problem in the art was also unsatisfactory. Therefore, I desired to develop an emergency distress signal which did not mount to any of the locations used in the prior art, and which would, therefore, avoid long standing problems in the art, but at the same time was sturdy enough to withstand the rigors of use, was small, and light enough to be easily stored in the automotive vehicle, and yet, could be easily seen all around the automotive vehicle when in use.

SUMMARY OF THE INVENTION

In order to provide a portable display means which meets all the above requirements, I have provided a signal having a self-storing retainer portion, including a substantially s-shaped channel member. One leg of the channel member is adapted to be inserted over the side glass found in the window of the front or rear door of the automotive vehicle, and be entrapped between the side glass and the window channel to held firmly in place, thereby. The other leg of the s-shaped channel member is adapted to hold a distress signal flag mounted on a rod means. Said rod means is preferrably collapsible or of a multi-piece construction which may be stored in retainer when not in use.

Thus, it is an object of the present invention to provide an inexpensive emergency distress signal for automotive vehicles.

It is a further object of the present invention to provide a portable display means, which is relatively simple in construction and economical to manufacture.

It is a further object of the present invention to provide an emergency distress signal which mounts on the automotive vehicle near the top of the door, thereof.

It is a still further object of the present invention to provide an emergency distress signal of the foregoing nature which clips on the side glass found in the door of an automotive vehicle and is entrapped between the glass and the window channel.

It is a still further object of the present invention to provide a lightweight emergency distress signal which is easily carried in the automotive vehicle, and is self-storing in nature.

It is a further object of the present invention to provide an emergency distress signal which can be easily seen above the automotive vehicle.

It is a further object of the present invention to provide an emergency distress signal which may be easily stored in the glove box or other small area of an automotive vehicle in its disassembled form.

It is a further object of the present invention to provide an emergency distress signal of the foregoing nature which has no metal parts, and thus, won't corrode when exposed to the elements.

Further objects and advantages of the present invention will be apparent from the following description and appended claims, reference being made to the accompanying drawings forming a part of the specification, wherein like reference characters designate corresponding parts in the several views.

BRIEF DESCRIPTION OF THE DRAWINGS

FIG. 1 is a perspective view showing a construction embodying my invention mounted to an automotive vehicle in its operative position.

FIG. 2 is an exploded perspective view of the construction shown in FIG. 1.

FIG. 3 is a sectional view, taken in the direction of the arrows, along the section line 3—3 of FIG. 1.

FIG. 4 is an exploded perspective view showing a construction embodying the present invention in its disassembled form, showing how it may be stored on the visor of an automotive vehicle.

FIG. 5 is a perspective view, partially cut away, showing a modified construction embodying my invention.

FIG. 6 is a perspective view, partially cut away, showing a further modification of my invention.

FIG. 7 is a perspective view, partially cut away, showing yet another modification of my invention.

It is to be understood that the present invention is not limited in its application to the details of the construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Referring now to FIG. 1, there is shown a perspective view of an automotive type vehicle, in this case, an automobile, generally designated by the numeral 25, having a roof 26, and a door 27, into which a side glass 28, is retractably mounted. My emergency distress signal, generally designated by the numeral 30, is shown mounted between the window channel 29, and the side glass 28, of the automobile 25.

Referring to FIGS. 2 and 3, it can seem that my emergency distress signal 30 is self-storing in nature and generally comprises an s-shaped channel member generally designated by the numeral 31, which includes a signal holding portion 32 and a mounting portion 33. The mounting portion 33, is the portion which is placed over the side glass 28 of the automobile 25 and holds the emergency distress signal in place between the window channel 29, and the side glass 28. The signal holding portion 32 further includes a first separate side wall 34 having a pair of axially extending, parallel, spaced apart ridges 35 formed integrally, therewith, as well as a bottom wall 36, and a common wall 37, having a separate convex portion 38.

The mounting portion 33 includes the common wall 37, also found in the signal holding portion 32, as well as a channel shaped top wall 45, and a second separate side wall portion 46, having a convex portion 47, along the lower edge, thereof.

A first locator clip 40, having a pair of parallel, spaced apart, transverse ridges 43, and a pair of extensions 44 which snap over the edges of the first side wall 34, between the axially extending ridges 35, form a portion of the rod locator means.

While the shapes of the common wall 37, first side wall 34, and second side wall 46, will usually remain the same regardless of the vehicle on which my invention is used, the shape of the channel shaped top wall 45 will vary depending on the particular installation, since said channel shaped top wall must be complimentary in shape to the window channel 29, of the automobile 25, in which it is mounted. It is noted also, that the second side wall 46, is preferably of a thinner cross-section than either the common wall 37, or the first side wall 34, to make insertion into the window channel 29 easier, and conformance to the shape of the side glass 28 of the automobile possible. Thus, it can be seen that my emergency distress signal is firmly held to the side glass of the automobile by the combination of the common wall 37, the channel shaped top wall 45, the second side wall 46, and the rod locator means.

Continuing to refer to FIGS. 2 and 3, a second locator clip 50, which may be identical to the first locator clip 40 already described, is snapped over the edges of the bottom wall 36. The shape of the s-shaped channel member 31 is such that the first side wall 34 is normally biased in tension toward the common wall 37, such that the insertion of the rod means 52, into the rod locator means, consisting of the first locator clip 40 and the second locator clip 50, spreads apart the first side wall 34 from the common wall 37, and provides sufficient tension between the first locator clip 40, the second locator clip 50, and the convex portion of the common wall 38, such that once inserted, the rod means 52, is not easily removed, and will have sufficient tension thereon, to stay in place when my emergency distress signal 30, is mounted to the side glass 28, of the automobile.

Referring now to FIG. 4, one convenient means for storage of my emergency distress signal can be seen as the mounting portion 33, of the s-shaped channel member 31, which serves to mount my emergency distress signal to the side glass of the automobile can also be used to mount the clip in its storage mode to the visor 55 ordinarily found in an automotive vehicle, the visor 55, being gripped between the common wall 37, and the second side wall 46.

For additional ease of storage the rod means 50, need not be a one piece rod, but can consist of a plurality of rod portions such as first rod portion 56, second rod portion 57, and third rod portion 58. The display (distress) flag 60, in this case, would be mounted to the third rod portion 58. The second rod portion 57, and the third rod portion 58, may both have peg portions 59, which will fit into holes 61, provided in the second rod portion 57, and the first rod portion 56. The first rod portion 56, second rod portion 57, and third rod portion 58 may all be stored between the first side wall 34 and the common wall 37 when not in use. Since there is tension exerted between the first side wall 34 and the common wall 37, not only will my emergency distress signal be firmly held to the sun visor 55, but the rod means will be securely held in place for use when needed.

It should be understood that the unique construction of my emergency distress signal makes it easily storable in places other than on the visor 55, as it can be stored in any practicable location where it may clipped on in a manner similar to that just described for clipping the same on to the visor, and it also may, because of its small size, be stored in the glove box, under a car seat, in the trunk, or other suitable locations in an automotive vehicle.

Referring now to FIGS. 5–7, several other modifications of my emergency distress signal are shown. In FIG. 5, for example, the parallel, axially extending ridges 35 forming a portion of the rod locator means and the embodiment shown in FIG. 2, have now been replaced by a side wall extension 62, having a notch 63, provided therein, with all other portions of my emergency distress signal remaining the same.

Referring to FIG. 6, there is shown a modification where, instead of eliminating the first locator clip 40, the second locator 50 is eliminated in favor of a hole 64 placed in the bottom wall 36, of the s-shaped channel member 31, while the embodiment shown in FIG. 7, shows the elimination of both the first locator clip 40, and the second locator 50, in embodiments where this may be desirable, these being replaced with groove 63, and hole 64, respectively. In the modification shown in FIGS. 6 and 7, the third rod portion 58 will also have thereon a peg portion 59, such as found on the first rod portion 56 and the second rod portion 57, but which is absent there from when the embodiment shown in FIGS. 2-5 is used.

While, as mentioned above, it will be necessary to modify the shape of the channel shaped top wall 45 of the mounting portion 33, of my emergency distress signal depending upon its application, it may also be desirable to vary the thicknesses of the wall sections, such as the first side wall 34, the common wall 37, and the second side wall 46, to provide for varying amounts of tension in the various members depending on the particular application to which my emergency distress signal is to be put. Generally it has been found by experimentation that the common wall 38 has the thickest cross-section to provide for maximum strength, while the first and second side walls, 34 and 46, respectively, may be thinner to provide, in combination with the common wall 38, the proper tension both for mounting the s-shaped channel member 31 on the side glass 28, and for retaining the rod means 52, in the mounting portion 33.

Likewise, the shapes of the convex portions 38 and 47 of the common wall 37 and second side wall 46 respectively, may need to be modified depending on application, but in this case more because of mounting considerations due to the design of the automobile, rather than to provide proper tension.

Thus, by carefully analyzing the requirements relating to the mounting and storage of an emergency distress signal for automotive vehicles, I have provided a novel construction for such emergency distress signal which has solved long standing problems in the art.

I claim:

1. An emergency distress signal including:
   (a) a substantially s-shaped channel member having,
      (i) a first separate side wall,
      (ii) a separate common wall,
      (iii) a bottom wall connecting said first separate side wall and said separate common wall,
      (iv) a second separate side wall; and
      (v) a top wall connecting said second separate side wall and said separate common wall,
   (b) rod locator means formed partially from said s-shaped channel member,
   (c) a rod means removably mounted to said s-shaped channel member in cooperation with said rod locator means; and,
   (d) an emergency distress flag attached to said rod means.

2. The device defined in claim 1, wherein:
   (a) said common wall has an axially extending convex protrusion formed therein.

3. The device defined in claim 2, wherein:
   (a) said top wall has a channel shaped portion formed therein.

4. The device defined in claim 3, wherein:
   (a) said second side wall has a axially extending convex portion formed adjacent to the lower edge, thereof.

5. The device defined in claim 4, wherein said rod locator means include:
   (a) a pair of parallel, spaced apart, axially extending ridges proximate the top edge of said first side wall; and
   (b) a first locator clip mounted to said first side wall between said ridges.

6. The device defined in claim 5, wherein said rod locator means further include:
   (a) a second locator clip attached to the bottom wall of said s-shaped channel member, said locator clip having a pair of parallel, spaced apart, transversely extending ridges approximate the middle thereof to assist in locating said rod means.

7. The device defined in claim 6, wherein said rod means is held in tension between said second locator clip and said convex protrusion on said common wall.

8. The device defined in claim 7, wherein said rod means include a plurality of rods assembled, end-to-end, to form said rod means.

9. The device defined in claim 8, wherein:
   (a) said rod means is disassembled and stored between said first wall and said common wall.

10. The device defined in claim 4, wherein said rod locater means include:
    (a) a hole proximate the middle of said bottom wall into which said rod means are inserted.

11. The device defined in claim 10, wherein said rod locator means include:
    (a) a side wall extension formed on said first side wall; and
    (b) a grove in said side wall in alignment with hole in said bottom wall.

12. An emergency distress signal including:
    (a) a substantially s-shaped channel member having,
       (i) a first separate side wall,
       (ii) a separate common wall,
       (iii) a bottom wall connecting said first separate side wall and said separate common wall,
       (iv) a second separate side wall, and
       (v) a top wall connecting said separate second side wall and said separate common wall,
    (b) rod locator means attached to said channel member,
    (c) a rod means removably mounted to said s-shaped channel member in cooperation with said rod locator means; and
    (d) an emergency distress flag attached to said rod means.

13. The device defined in claim 12, wherein:
    (a) said common wall has an axially extending convex protrusion formed therein.

14. The device defined in claim 13, wherein:
    (a) said top wall has a channel shaped portion formed therein.

15. The device defined in claim 14, wherein:
    (a) said second side wall has an axially extending convex portion formed adjacent the lower edge thereof.

16. The device defined in claim 15, wherein said rod locator means include:
   (a) a first locator clip attached to said first side wall of said s-shaped channel member; and
   (b) a second locator clip attached to said bottom said wall.

17. The device defined in claim 16 wherein said rod means is held in tension between said second locater clip and said convex protrusion on said common wall.

18. The device defined in claim 17, wherein said rod means include a plurality of rods assembled, end-to-end, to form said rod means.

19. The device defined in claim 18, wherein said rod means is disassembled and stored between said first side wall and a said common wall.

20. A substantially s-shaped channel member including:
   (a) a first, separate, side wall,
   (b) a separate common wall having an axially extending convex protrusion thereon,
   (c) a bottom wall connecting said first separate side wall and said separate common wall,
   (d) a separate second side wall having an axially extending convex portion adjacent to the lower edge thereof; and
   (e) a top wall connecting said second separate side wall and said separate common wall, and having a channel shaped portion therein.

21. A portable display means including:
   a. a substantially S-shaped channel member having,
      i. a first separate side wall,
      ii. a separate common wall,
      iii. a bottom wall connecting said first separate side wall and said separate common wall
      iv. a second separate side wall; and
      v. a top wall connecting said separate side wall and said separate common wall,
   b. a rod locator means formed at least partially from said S-shaped channel member;
   c. a rod means removable mounted to said S-shaped channel member in cooperation with said rod locator means; and
   d. a display flag attached to said rod means.

22. The device defined in claim 21 wherein:
   a. said common wall has an axially extending convex protrusion formed therein.

23. The device defined in claim 24, wherein:
   a. said second side wall has an axially extending convex portion formed adjacent to the lower edge thereof.

24. The device defined in claim 23, wherein said rod locator means include:
   a. a pair of parallel, spaced apart, axially, extending ridges proximate the top edges of said first side wall; and
   b. a first locator clip mounted to said first side wall between said ridges.

25. The device defined in claim 24, wherein said rod locator means further include:
   a. a second locator clip attached to the wall of said S-shaped channel member, said locator clip having a pair of parallel, spaced apart, transversely extending ridges approximate the middle thereof to assist in locating said rod means.

26. The device defined in claim 24, wherein said rod means is held in tension between said second locator clip and said convex protrusion on said common wall.

27. The device defined in claim 26, wherein said rod means include a plurality of rods assembled, end-to-end, to form said rod means.

28. The device defined in claim 27, wherein:
   a. said rod means is disassembled and stored between said first wall and said common wall.

29. The device defined in claim 23, wherein said rod locator means include:
   a. a hole proximate the middle of said bottom wall into which said rod means are inserted.

30. The device defined in claim 29, wherein said rod locator means include:
   a. a side wall extension formed on said first side wall; and
   b. a groove in said side wall in alignment with said hole in said bottom wall.

31. A portable display means, including:
   a. a substantially S-shaped channel member having:
      i. a first separate side wall;
      ii. a separate common wall;
      iii. a bottom wall connecting said first separate side wall and said separate common wall;
      iv. a second separate side wall; and
      v. a top wall connecting said separate second side wall and said second common wall;
   b. a rod locator means attached to said channel member; and
   c. a rod means removably mounted to said S-shaped channel member in cooperation with said rod locator means; and
   d. a display flag attached to said rod means.

32. The device defined in claim 31, wherein:
   a. said common wall has an axially extending convex protrusion formed therein.

33. The device defined in claim 32, wherein:
   a. said top wall has a channel shaped portion formed therein.

34. The device defined in claim 33, wherein:
   a. said second side wall has an axially extending convex portion formed adjacent the lower edge thereof.

35. The device defined in claim 34, wherein said rod locator means include:
   a. a first locator clip attached to said first side wall of said S-shaped channel member; and
   b. a second locator clip attached to said bottom side wall.

36. The device defined in claim 35, wherein said rod means is held in tension between said second locator clip and said convex protrusion on said common wall.

37. The device defined in claim 36, wherein said rod means include a plurality of rods assembled, end-to-end, to form said rod means.

38. The device defined in claim 18, wherein said rod means is disassembled and stored between said first side wall and said common wall.

* * * * *